(12) United States Patent
Shim et al.

(10) Patent No.: US 9,235,535 B1
(45) Date of Patent: Jan. 12, 2016

(54) METHOD AND APPARATUS FOR REDUCING OVERHEADS OF PRIMARY STORAGE BY TRANSFERRING MODIFIED DATA IN AN OUT-OF-ORDER MANNER

(71) Applicants: Hyong Shim, Basking Ridge, NJ (US); Philip N. Shilane, Yardley, PA (US); Windsor W. Hsu, San Jose, CA (US)

(72) Inventors: Hyong Shim, Basking Ridge, NJ (US); Philip N. Shilane, Yardley, PA (US); Windsor W. Hsu, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 226 days.

(21) Appl. No.: 13/665,885

(22) Filed: Oct. 31, 2012

(51) Int. Cl.
*G06F 12/16* (2006.01)
*G06F 7/08* (2006.01)
*G06F 7/24* (2006.01)

(52) U.S. Cl.
CPC .......... *G06F 12/16* (2013.01); *G06F 7/08* (2013.01); *G06F 7/24* (2013.01)

(58) Field of Classification Search
CPC .................................................. G06F 12/16
USPC .................................................. 711/162
See application file for complete search history.

(56) References Cited

U.S. PATENT DOCUMENTS

| | | | |
|---|---|---|---|
| 7,054,790 B1 | 5/2006 | Rich | |
| 7,284,019 B2 | 10/2007 | Adkins et al. | |
| 7,739,677 B1 * | 6/2010 | Kekre et al. | 717/168 |
| 8,122,158 B1 | 2/2012 | Kudva et al. | |
| 8,732,417 B1 * | 5/2014 | Stringham | 711/162 |
| 2007/0079089 A1 * | 4/2007 | Ohran et al. | 711/162 |
| 2008/0082593 A1 | 4/2008 | Komarov et al. | |
| 2008/0208929 A1 | 8/2008 | Phillipi | |
| 2008/0307160 A1 * | 12/2008 | Humlicek | 711/113 |
| 2009/0167871 A1 | 7/2009 | Usui | |
| 2012/0278569 A1 * | 11/2012 | Kawakami et al. | 711/162 |
| 2012/0311246 A1 * | 12/2012 | McWilliams et al. | 711/103 |
| 2014/0082310 A1 * | 3/2014 | Nakajima | 711/162 |

OTHER PUBLICATIONS

Non-Final Office Action, U.S. Appl. No. 13/665,884, dated Dec. 11, 2014, 14 pages.
Non-Final Office Action, U.S. Appl. No. 13/665,881, dated Dec. 17, 2014, 11 pages.
Office Action mailed Apr. 3, 2015, for U.S. Appl. No. 13/665,884, filed Oct. 31, 2012, 17 pages.
Office Action mailed May 29, 2015, for U.S. Appl. No. 13/665,881, filed Oct. 31, 2012, 12 pages.

\* cited by examiner

*Primary Examiner* — Kevin Verbrugge
*Assistant Examiner* — Zubair Ahmed
(74) *Attorney, Agent, or Firm* — Blakely, Sokoloff, Taylor & Zafman LLP

(57) ABSTRACT

Techniques for reducing overheads of primary storage transferring during a backup by transferring in an out-of-order manner are described herein. According to one embodiment, in response to a request at a primary storage for a backup of a plurality of data blocks, a transfer order of dirty data blocks is determined based on an access assessment of the dirty data blocks, wherein the dirty data blocks are data blocks of the plurality of data blocks that have been changed from a previous backup, and wherein the transfer order is different from a sequential logical order of the dirty data blocks provided by the primary storage. Then the dirty data blocks are transferred to a secondary storage in the determined order.

24 Claims, 13 Drawing Sheets

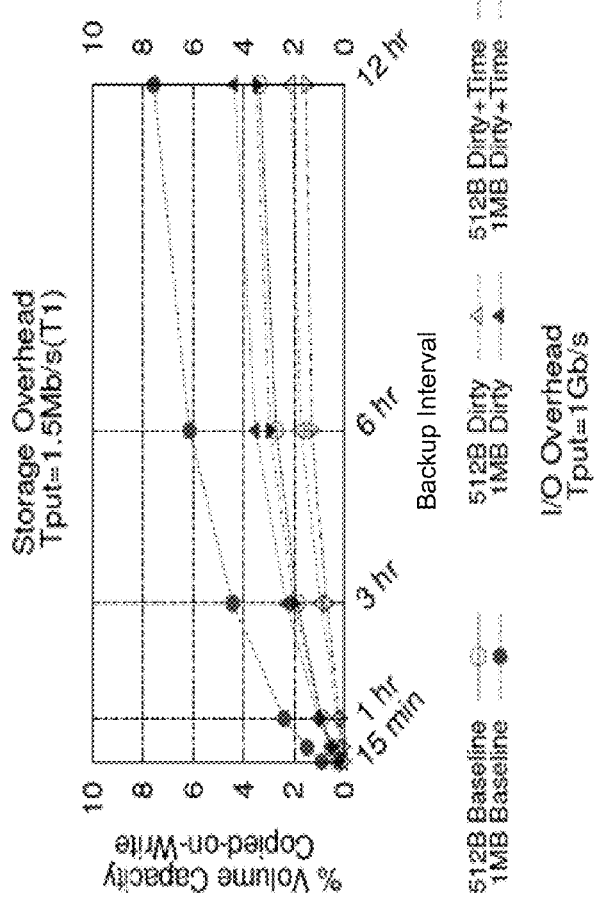
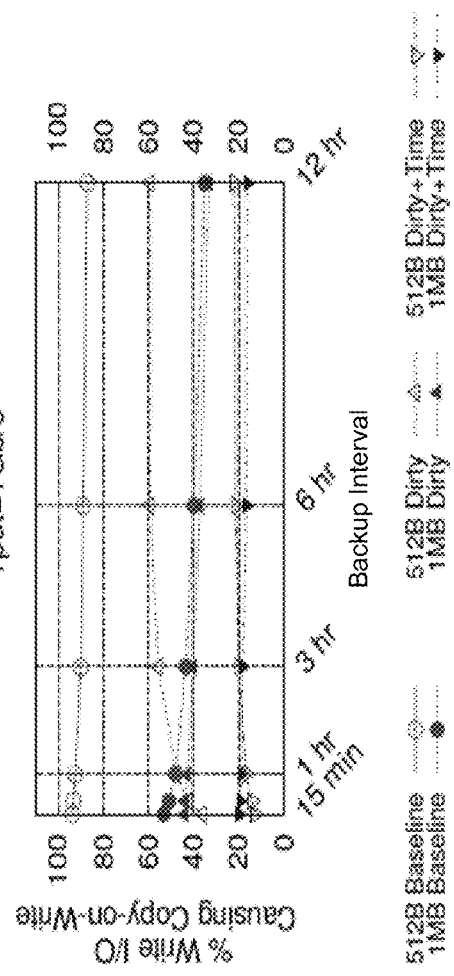
FIG. 6A
FIG. 6B

METHOD AND APPARATUS FOR REDUCING OVERHEADS OF PRIMARY STORAGE BY TRANSFERRING MODIFIED DATA IN AN OUT-OF-ORDER MANNER

RELATED APPLICATIONS

This application is related to co-pending U.S. patent application Ser. No. 13/665,884, entitled "Method and Apparatus for Reducing Overheads of Primary Storage while Transferring Modified Data," filed Oct. 31, 2012, and co-pending U.S. patent application Ser. No. 13/665,881, entitled "Method and Apparatus for Transferring Modified Data Efficiently," filed Oct. 31, 2012, which are incorporated by reference herein in its entirety.

FIELD OF THE INVENTION

Embodiments of the present invention relate generally to data storage systems. More particularly, embodiments of the invention relate to incremental data backup.

BACKGROUND

Data storage is a critical component for computing. In a computing device, there is a storage area in the system to store data for access by the operating system and applications. In a distributed environment, additional data storage may be a separate device that the computing device has access to for regular operations. This kind of data storage is generally referred to as a primary storage, in contrast with a secondary storage, where computing devices also have access to but generally used for backing up. For data protection purposes, it is important to make regular copies of data from a primary storage to a secondary storage. While early backup strategies created complete (full) backups periodically, an alternate technique is to transfer only the incrementally modified data. By stitching together a newly modified data with a previous complete copy on the secondary storage, a new full backup can be reconstructed.

Typically, when a backup request is received at a primary storage system, a snapshot of the data to be backed up is captured and the snapshot is then transmitted from the primary storage system to a secondary storage system (also referred to as a target storage system, the terms secondary storage system, secondary storage, and target storage system are used interchangeably within the specification), while the primary storage system is still receiving further writes from a host. When the primary storage receives write requests from computing devices, it may write the data to the same locations that may be involved in the process of getting backed up to a secondary storage. To ensure the data integrity at such locations, the primary storage may utilize certain extra operations such as copy-on-write to copy the data at a storage location to a corresponding location in the snapshot as part of processing a write request. Such an operation incurs significant overheads.

BRIEF DESCRIPTION OF THE DRAWINGS

Embodiments of the invention are illustrated by way of example and not limitation in the figures of the accompanying drawings in which like references indicate similar elements.

FIGS. 6A-B are diagrams illustrating computer simulation results comparing embodiments of the inventions and embodiments of baseline operations without this invention.

DETAILED DESCRIPTION

Figure 1:
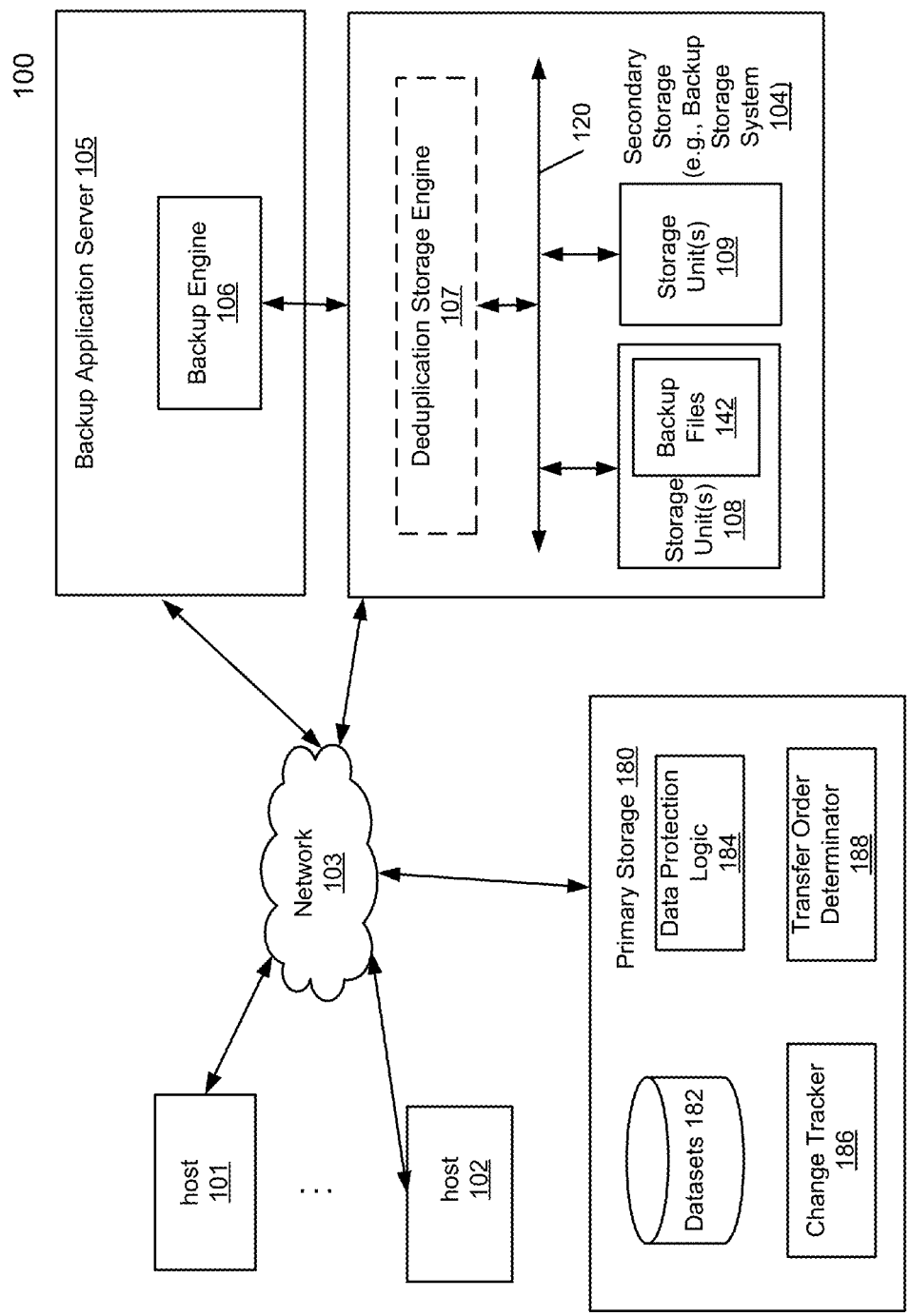
FIG. 1 is a block diagram illustrating a backup process according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A dataset is a collection of data that is stored in a storage space in a variety of formats. In some embodiments, a storage space is a sector-based system, where sectors are the basic storage units and a number of sectors make up a data block, or blocks, and a number of blocks make a logical unit (that is identified by a LUN, Logical Unit Number). A storage space may contain a number of logical units. A dataset may be a collection of sectors, blocks, logical units, or a combination thereof. Note the terms "data block" and "block" are used interchangeably within the specification.

According to some embodiments, a host is a computing device that is communicatively coupled with a primary storage. Both the host and the primary storage may be communicatively coupled with a backup application server and a secondary storage over a network (e.g., the Internet, a storage network), where the backup application server coordinates backup from the primary storage to the secondary storage. Backup is a process of copying datasets from one storage system to another storage system. A backup may be a full backup that copies an entire dataset from one storage system to another system or an incremental backup that copies only changed portion of the dataset. In an alternative embodiment, primary storage may have functionality to initiate a backup. A request for a backup of some data blocks is sent from the backup application server to the primary storage. The primary storage then establishes a consistent state of the data blocks (consistent state may also be called point-in-time value, and the two terms are used interchangeably in this specification). In one embodiment, this involves capturing a snapshot of the data blocks. For an incremental backup, the primary storage then identifies the data blocks that have been changed since a previous backup. When a sector, a block, or a logical unit has changed since the previous backup, it is referred to as a "modified" or "dirty" sector, block, or logical unit, and needs to be backed up to the secondary storage; other unchanged blocks are referred as "normal" blocks. For a full backup, all the data blocks are considered dirty. The blocks from the snapshot that are dirty are transferred to the secondary storage over the network. During a period of transferring the identified dirty blocks, the primary storage, in response to a storage write (or write, the terms storage write and write are used interchangeably in this specification) from a host to a block, may need to preserve the contents in the block if the block is dirty. In one embodiment, the original contents of the dirty block is copied to an alternate block and read from the alternate block to transfer the contents to the secondary storage. In another embodiment, the incoming storage write is redirected to an alternate block. The primary storage commits the storage write to the block without copying if the block is not dirty. Since host storage writes to normal blocks do not trigger preservation, the incremental backup is more efficient than a system where all host storage writes to blocks trigger duplication.

According to an embodiment, marking of dirty blocks from the transfer state back to the normal state is performed after all dirty blocks have been transferred from the primary storage to the secondary storage. According to another embodiment, when a particular dirty block has been transferred from the primary storage to the secondary storage, that particular dirty block is marked from the transfer state to the normal state, while remaining dirty blocks are still being transferred.

In the embodiments above, dirty blocks are transferred in a sequential logical order predetermined by a primary storage. Yet according to some embodiments, dirty blocks may be assigned to a transfer order different from a sequential logical order to reduce data content preservation and make an incremental backup more efficient. In one embodiment, the primary storage may assign dirty blocks to a transfer order based on an access assessment of the dirty blocks, the transfer order being different from the sequential logical order. In one embodiment, the primary storage identifies hot regions within a storage space of the primary storage. When a dirty block is in or near a hot region (e.g., within a predetermined proximity), the dirty block has a higher priority in transferring to the secondary storage. In some embodiments, a hot region may be determined based on physical closeness of the dirty block to frequently changed regions of the primary storage, physical closeness of the dirty block to a number of dirty blocks, physical closeness of the dirty block to a next write, history of the dirty block being written, and/or times of the dirty block being written in a period of time. In other embodiments, the primary storage may assign the dirty blocks to a transfer order based on readiness of a stable read resource of the dirty blocks, the importance of the dirty blocks, contents of the dirty blocks (e.g., metadata of a file system may be transferred first), and other defined criteria. These criteria may be used singularly or in combination to reduce data content preservation triggered by incremental backup. In some embodiment, transfer of the dirty blocks assigned to a transfer order also utilizes techniques of the marking blocks with states of transfer and normal as disclosed in the embodiments herein above to further reduce transfer overheads.

System Configuration

FIG. 1 is a block diagram illustrating a backup process according to one embodiment of the invention. Referring to FIG. 1, system 100 includes, but is not limited to, one or more hosts 101-102 communicatively coupled to one embodiment of a secondary storage (backup storage system 104), backup application server 105 and primary storage 180 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless. Note, while backup storage system 104 is shown in FIG. 1 for illustration purpose, other types of secondary storages are used according to some embodiments of the invention. For example, a secondary storage may be a replica of primary storage 180 or a snapshot repository of primary storage 180.

Backup storage system 104 may include any type of server or cluster of servers. For example, backup storage system 104 may be a storage server used for any of various different purposes, such as to provide multiple users with access to shared data and/or to back up mission critical data. Backup storage system 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Backup storage system 104 may have a distributed architecture, or all of its components may be integrated into a single unit. Backup storage system 104 may be implemented as part of an archive and/or backup storage system such as a de-duplication storage system available from EMC® Corporation of Hopkinton, Mass.

In one embodiment, backup application server 105 includes, but is not limited to, a backup engine 106. Backup application server 105 coordinates with backup storage system 104, primary storage 180, and hosts 101-102 to run various backup operations. Backup engine 106 may perform both backup and restore functions.

In one embodiment, backup storage system 104 may include, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of nonvolatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID). Backup files 142 represent files stored in storage units 108. Note that in one embodiment, backup application server 105 and backup storage system 104 are integrated into one single system.

In response to a data file to be stored in storage units 108-109, optional deduplication storage engine 107 is configured to segment the dataset into multiple segments (also referred to as data chunks or simply chunks) according to a variety of segmentation policies or rules. Deduplication storage engine 107 only stores a segment in a storage unit if the segment has not been previously stored in the storage unit. In the event that a segment has been previously stored, metadata stores information enabling the reconstruction of a file using the previously stored segment. As a result, segments of datasets are stored in a deduplicated manner, either within each of storage units 108-109 or across at least some of storage units 108-109. Datasets stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 108-109, such that datasets can be accessed independent of another storage unit. Metadata of each storage unit includes enough information to provide access to the datasets it contains. When an active storage unit fails, metadata contained in another storage unit may be utilized to recover the active storage unit. When one storage unit is unavailable (e.g., the storage unit has failed, or is being upgraded, etc.), the system remains up to provide access to any dataset not stored in the failed storage unit. When a dataset is deleted, the metadata associated with the datasets in the system is updated to reflect that the dataset has been deleted.

In one embodiment, the metadata information includes a dataset identifier, a storage unit where the segments associated with the dataset identifier are stored, reconstruction information for the dataset using the segments, and any other appropriate metadata information. In one embodiment, a copy of the metadata is stored on a storage unit for datasets stored on a storage unit so that datasets that are stored on the storage unit can be accessed using only the information stored on the storage unit. In one embodiment, a main set of metadata information can be reconstructed by using information of other storage units associated with the backup storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the backup storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Datasets are periodically moved among the tiers based on data management policies to achieve a cost-effective match to the current storage requirements of the datasets. For example, a dataset may initially be stored in a tier of storage that offers high performance for reads and writes. As the dataset ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 106 is configured to back up data from hosts 101-102 and to store the backed up data in one or more of storage units 108 of backup storage system 104, where the data may be deduplicated by deduplication storage engine 107. In this example, a user (e.g., an administrator) initiates a backup request, directly or through a backup schedule, of primary storage 180. Note in some embodiments, the user may request a full backup or an incremental backup, and primary storage 180 decides whether full datasets or changed datasets only are transferred (e.g., primary storage 180 may decide to transfer changed datasets only when the secondary storage has an earlier backup of the datasets and only changed datasets are needed to fully reconstruct the datasets at the secondary storage).

Primary storage 180 may include any type of server or cluster of servers. For example, primary storage 180 may be a storage server used for any of various different purposes, such as to provide multiple users with access to shared data and/or to back up mission critical data. Primary storage 180 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Primary storage 180 may have a distributed architecture, or all of its components may be integrated into a single unit. Primary storage 180 may be implemented as part of a storage system available from EMC® Corporation of Hopkinton, Mass.

Primary storage 180 contains datasets 182, which represent the data stored in the primary storage. Datasets 182 may be stored across a number of logical units, and each identified by a logical unit number (LUN). Each logical unit may contain a number of blocks, and each block may contain a number of sectors. Primary storage 180 also contains data protection logic 184 that manages both backup and restore processes within primary storage 180. Primary storage 180 also contains change tracker 186 to track changes of datasets within the primary storage. In one embodiment, the changes tracked are the changes of datasets from a previous backup. Primary storage 180 may also include transfer order determinator 188 that reorders datasets within the primary storage. In one embodiment, transfer order determinator 188 determines a transfer order of dirty datasets for backup transfer as discussed herein below.

Data Preservation During an Incremental Backup

Figure 2:
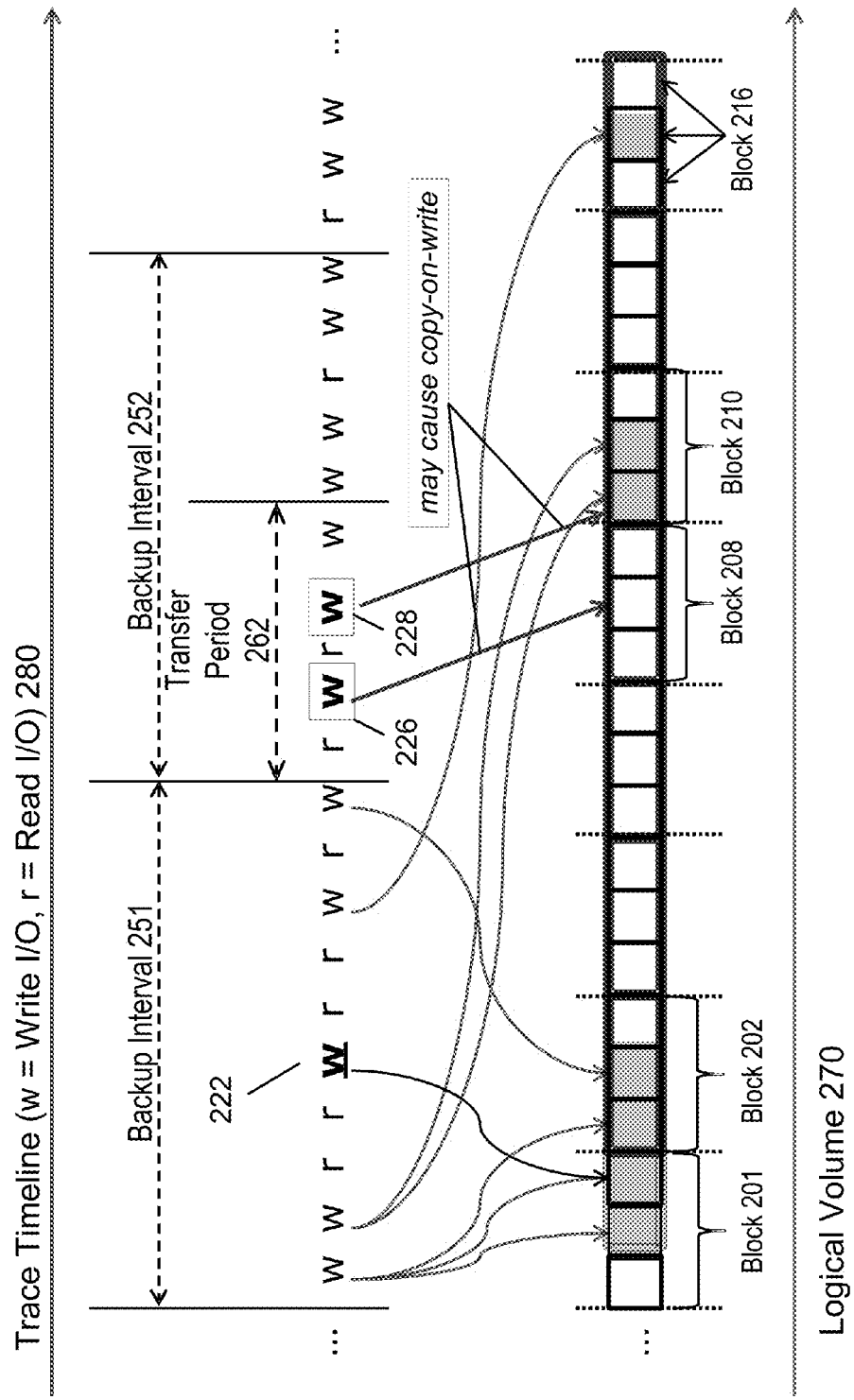
FIG. 2 is a block diagram illustrating data content preservation during an incremental backup process.

FIG. 2 is a block diagram illustrating data content preservation during an incremental backup process. Trace timeline 280 illustrates timeline of backups of dataset 182 of primary storage 180 to a secondary storage (e.g., backup storage system 104) of FIG. 1. As shown, backups are periodically performed, and backup intervals 251 and 252 are two examples. Note backup intervals 251 and 252 do not need to be equal and backup intervals may change from time to time. A backup request triggered dataset transfer starts at the beginning of a backup interval and ends when the requested dataset has been transmitted from a primary storage to a backup storage system. Transfer period 262 illustrates the duration of a transfer period for blocks dirtied during backup interval 251. Transfer period 262 is shorter than backup interval 252 so that dataset transfer can be completed within a backup interval.

As primary storage 180 is online during backup intervals, a list of write and read operations to primary storage 180 is shown, where a "w" represents a write input/output (I/O) operation and an "r" represents a read I/O operation by a host (e.g., host 102 in FIG. 1). While FIG. 2 shows that "w" and "r" occur at a roughly equal interval, this is for simplicity of illustration. Read I/O and write I/O may occur at a non-even pace. A write affects one or more consecutive sectors that may span one or more blocks. FIG. 2 shows sectors and blocks as a part of datasets of logical volume 270. In this example, a block contains 3 sectors. In an incremental transfer of logical volume 270, only changed datasets ("dirty" datasets) need to be transferred to a backup storage. A changed sector or a block is blacked out to indicate they have been changed and thus need to be transferred. Blocks 201, 202, 210, and 216 are changed blocks. Block 208 is not changed from a previous backup. Note "w" at reference 222 writes to a sector in block 201 that has been written already, and the second write does not change the status of the sector, which already indicates being "dirty." Also note "w" at reference 226 writes to block 208 that is unchanged from a previous backup, and "w" at reference 228 writes to block 210 that has been changed from a previous backup. Yet both writes at references 226 and 228 may cause copy-on-write. The agnostic copy-on-write causes transfer overheads that are more than necessary and embodiments of this invention will address the issue as discussed herein below.

Copy-on-write is one way of duplicating data so that the data integrity of the dirty blocks to be transferred can be maintained during a concurrent read and write operation. For dirty block transfer, a snapshot of the identified dirty blocks is captured to obtain a consistent state of the dirty blocks. The snapshot of the identified dirty blocks is then transferred from the primary storage to the secondary storage. With copy-on-write during data transfer, a write of a dataset from a host triggers a copy of the dataset to a different location (e.g., at a snapshot space) so that the write at the original location does not affect the transferred data. For example, referring to FIG. 2, upon the write I/O at reference 228, the data in block 210 is copied to a new block in the snapshot space first and then the new data of write I/O at reference 228 is written to the first sector of block 210. Another way to keep data integrity during data transfer is redirect-on-write, where a write of a data block is appended to a log or some other alternate location instead of writing to the original location of the dataset. Redirect-on-write causes the new dataset to be written in the alternate location while copy-on-write causes the old dataset to be written to the snapshot space and the new dataset is written to the same location of the old dataset. Both copy-on-write and redirect-on-write take an extra write I/O, and they take storage spaces and affect the performance characteristics of the primary storage. In this example, while it is understandable that write at reference 228 to block 210 triggers a copy-on-write as the write happens during transferring of changed block 210, write at reference 226 should not need to trigger a copy-on-write as block 208 will not be transferred from primary storage 180 to backup storage system 104 during transfer period 262.

A First Set of Embodiments of the Inventions

Figure 3A:
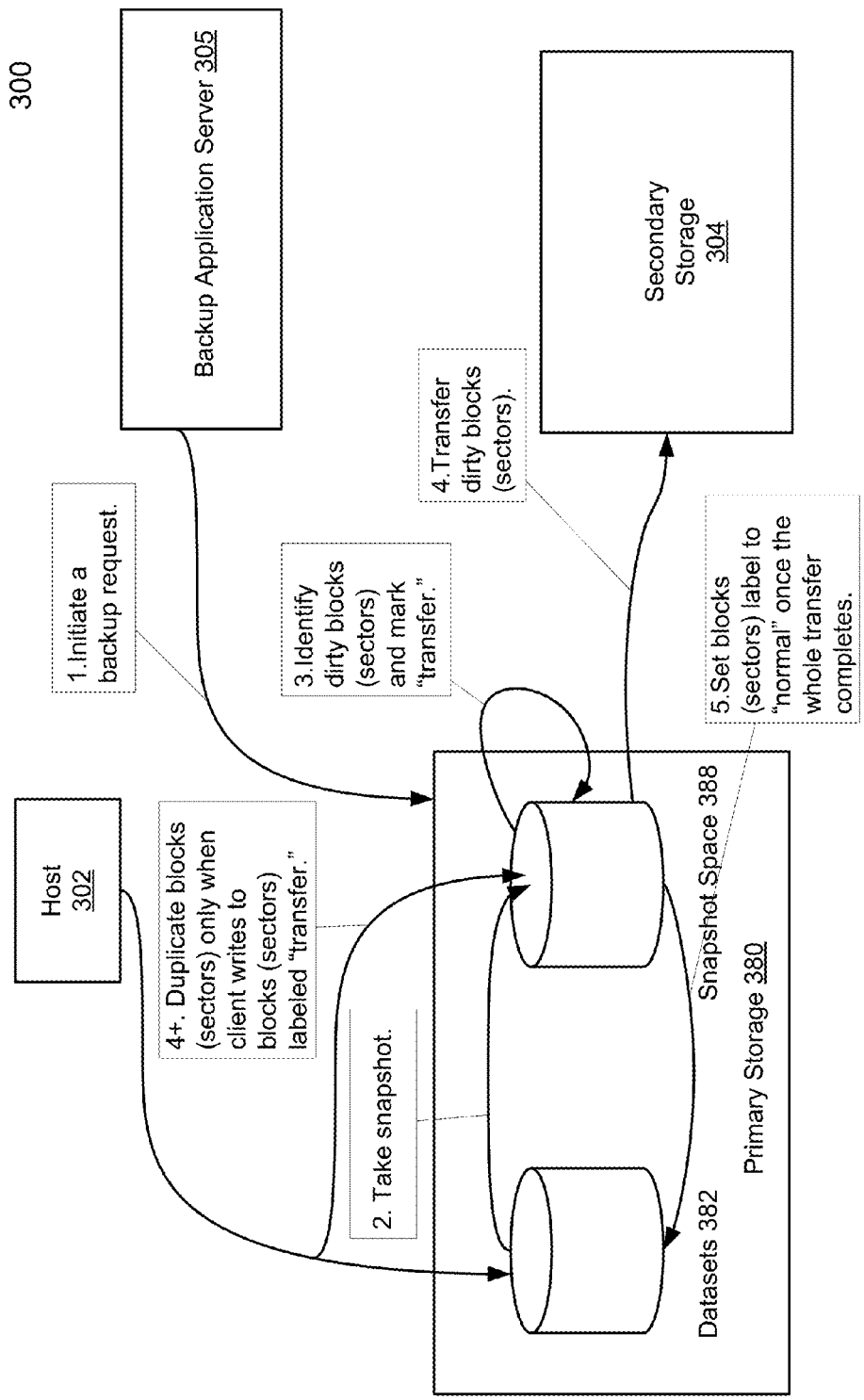
FIG. 3A is a block diagram illustrating an incremental backup process using a first set of embodiments of the invention at a primary storage.

FIG. 3A is a block diagram illustrating an incremental backup process using a first set of embodiments of the invention at a primary storage. Task boxes 1 to 5 illustrate the order in which operations are performed according to one embodiment of the invention. System 300 is similar to system 100 in FIG. 1 and the same or similar references indicate elements or components having the same or similar functionalities. The connectivity between various entities and modules within entities are omitted in FIG. 3A to leave space to discuss the incremental backup process more clearly. The process starts at backup application server 305 with a request for a backup of host 302. The backup request may be for an incremental backup in some embodiment, and the backup request may be for a full backup in another embodiment. Primary storage 380 receives the request. In one embodiment, the request comes from a user directly through a user interface. In another embodiment, the request comes from secondary storage system 304 or primary storage 380 itself based on a backup schedule. After receiving the request, primary storage 380 decides to initiate an incremental backup (for example, through data protection logic 184 of FIG. 1). Primary storage may decide to initiate an incremental backup even if the backup request does not explicitly requests so for transfer efficiency purposes. At task box 2, a snapshot is captured to establish a consistent state of datasets within primary storage 380. The datasets are represented by datasets 382. The resulting snapshot is saved at snapshot space 388.

At task box 3, dirty blocks within the snapshot are identified. In some embodiments, identifying dirty blocks is not a separate process; rather, it is a part of processing host write requests by the primary storage. In other words, identification of dirty blocks may happen prior to or concurrently with a backup request is received at primary storage 380. As discussed herein above, dirty blocks are the blocks changed since a previous backup, and they are the ones that need to be transferred to secondary storage system 304. The identification of dirty blocks may be achieved through a variety of ways. For example, a variety of data structures such as a bit vector or a table (e.g., hash table, tree, or array) may be used to track dirty blocks within primary storage 380. A change tracker like change tracker 186 may be used to store the status of blocks within primary storage 380 by implementing the aforementioned variety of data structures. In one embodiment, two data structures are used to store the status of blocks. One data structure stores the status of block changes before the starting of transferring of blocks (referred to as a past change tracker, or PCT), and the other stores the status of block changes at the current backup interval (referred to as a current change tracker, or CCT). When a block within primary storage 380 has been changed since a previous backup but before the starting of transferring of blocks, the status of the block will be labeled with "transfer" in the PCT, indicating that the block needs to be transferred to secondary storage 304. If a block has not changed since a previous backup (e.g., the last backup) and before the starting of transferring of blocks, the status of the block will be labeled with "normal" in the PCT. By checking the status of all the blocks in the PCT, dirty blocks are identified at task box 3. Note that at the starting of transferring in the current backup interval, the status of CCT for all blocks are "normal" as no host write has occurred yet (thus no change is recorded). Then at task box 4, dirty blocks are transferred to secondary storage system 304. After transfer starts and before transfer completes, host 302 may continue writing to primary storage 380. Since the write happens after transfer starts at task box 4, "4+" is used to denote post transfer initiation actions. At task box 4+, a write to a dirty block (which is labeled with "transfer") will trigger a data content preservation action of the dirty block to snapshot space 388 while the block is written to Dataset 382. A write to an unchanged block (which is labeled with "normal") does not trigger a data content preservation action according to one embodiment, since such an unchanged block will not be transferred to the secondary storage. Note the removal of a data content preservation action for unchanged blocks differentiates the embodiment of a backup process illustrated in FIG. 3 from an agnostic copy-on-write process illustrated at references 226 and 228 in FIG. 2. In one embodiment, the data content preservation action is performed via a copy on write operation, and in another embodiment, the data content preservation action is performed via a redirect on write operation. Importantly, a host write to a "normal" block indicted in the CCT will cause the status of the block changes to "transfer" as CCT tracks current changes of blocks. Then at task box 5, the data transfer completes. After the data transfer completes, the label on all "transferred" blocks in the PCT are reset to "normal." At the same time, all changes to a block during the current backup interval will trigger a labeling of the block to "transfer" in the CCT. We name this type of incremental backup as "dirty dataset duplication" as only dirty dataset triggers duplication during incremental backup. Note, if the current backup interval is backup interval N, at a backup immediately follows the current backup (referred to as backup interval N+1), the PCT of backup interval N will become a current change tracker for backup interval N+1 as it has been reset to "normal" after the transfer period at backup N. The former PCT of backup interval N now can be used to track changes during backup interval of backup N+1. The CCT for backup interval N switches its role and becomes a PCT of backup interval N+1 as it has records of all changes during the backup interval of backup N+1. The roles between the two trackers alternate in the following backup intervals.

Note the embodiment uses blocks to illustrate the operation of incremental backup. The invention is not so limited. For example, the process can be operated at a sector level, where changes of sectors from a previous backup are tracked at a change tracker such as change tracker 186 and a data content preservation action happens only when a host writes to a dirty sector during a transfer period. Similar to operation on blocks, after the data transfer completes, the labels on all sectors are reset to "normal" in a PCT for all sectors and the label of a sector in a CCT is changed to "transfer" once the sector is written.

Figure 3B:
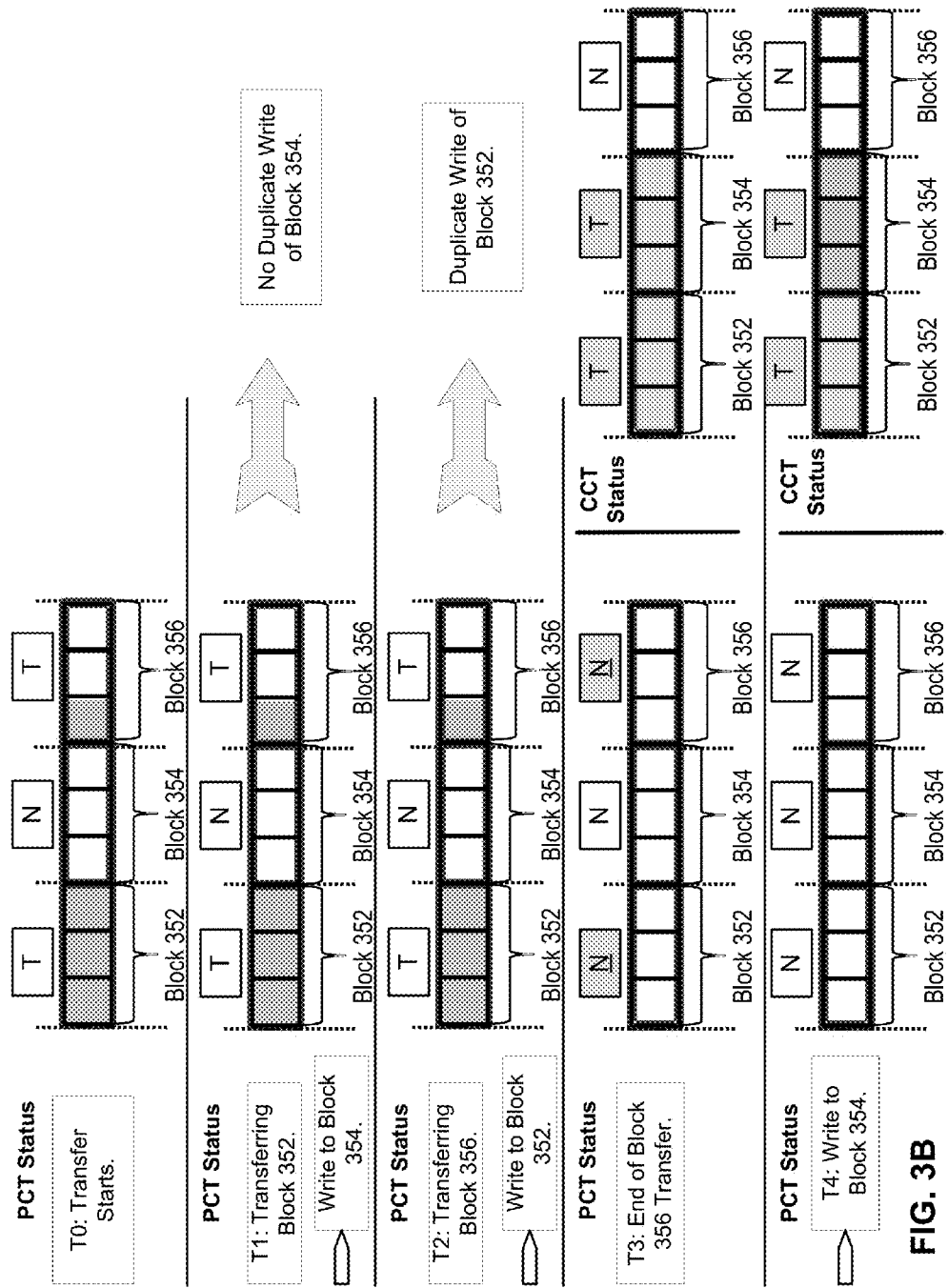
FIG. 3B is another block diagram illustrating an incremental backup process using the first set of embodiments of the invention at a primary storage.

FIG. 3B is another block diagram illustrating an incremental backup process using the first set of embodiments of the invention at a primary storage, in which the primary storage system copies dirty blocks to the snapshot space the first time when a host writes to them while they are getting transferred. FIG. 3B focuses on illustrating changes of status labels of blocks in a PCT and a CCT associated with a primary storage. At time T0, incremental backup triggered block transfer starts. At time T0, block 352 is labeled with "transfer" ("T"), block 354 is labeled with "normal" ("N"), and block 356 is labeled with "transfer" in the PCT. The status for all blocks in the CCT is "normal" at time T0 (not shown). At time T1, block 352 is getting transferred to a secondary storage and a host requests a write to block 354. Because block 354 is labeled with "normal" in the PCT, the write does not trigger a data content preservation action of block 354. However, the write to block 354 triggers the CCT status of block 354 changes from "normal" to "transfer" (not shown). Then at time T2, block 352 has been transferred already and block 356 is getting transferred to the secondary storage and a host requests write to block 352. Since block 352 is labeled with "transfer" in the PCT, the write triggers a data content preservation action of block 352 to a block in the snapshot that corresponds to block 352 (not shown); any subsequent writes to block 352 do not cause data content preservation actions. At the same time, the write to block 352 triggers the CCT of block 352 changes from "normal" to "transfer" (not shown). At time T3, transfer of block 356 completes, and since that is the last dirty block, the incremental backup is done, and the labels of transfer state should reset to "normal." Thus, labels of blocks 352 and 356 reset to "normal" in the PCT as shown. For CCT, since blocks 352 and 354 have been written during the transfer period, the labels of blocks 352 and 354 are changed to "transfer" as shown. Afterward, at time T4, a host writes to block 354, and the write does not trigger block 354 to change label in the CCT since it has been in "transfer" state in the CCT already. At time T4, the PCT remains all "normal" for all blocks. As discussed herein above, the PCT will become a CCT in the next backup interval and the status of blocks in the CCT of the next backup interval may be changed after the next backup interval starts and host write requests come in. Because the write at time T1 does not trigger a data content preservation action, the performance characteristics of the primary storage increase as one less I/O operation and less storage space are required in this example.

In another embodiment, the labeling can be done at sector level. In that case, all 9 sectors of blocks 352-356 in FIG. 3B have individual "transfer" and "normal" labels, which takes more processing resource to manage. At the same time, the process may save more data content preservation actions as some blocks have only a portion being dirty (e.g., block 356 has only one dirty sector), and writes to normal sectors do not trigger data content preservation actions, thus making data content preservation decision at sector level may further reduce data content preservation actions. Note that the number of sectors included in a block may be implementation specific; more or fewer sectors may be included in a block dependent upon the specific storage configuration. The size of a sector, which is typically 512 bytes, may also be implementation specific. Different storage systems may have different sector sizes. In addition, tracking at a block level vs. a sector level may also be implementation specific or user configurable, dependent upon the processing resources available in the system. For example, if tracking is performed at the sector level, more processing resources (e.g., memory) may be required to keep track of the sectors compared with the block level tracking. However, sector level tracking may cause fewer duplicated writes to the snapshot, which reduces more overhead. A hybrid mode having both sector level tracking and block level tracking may also be implemented dependent upon the storage characteristics or configurations. For example, tracking of a "hot" region (e.g., frequently accessed region) of the primary storage may be conducted at a sector level.

A Second Set of Embodiments of the Invention

Figure 4A:
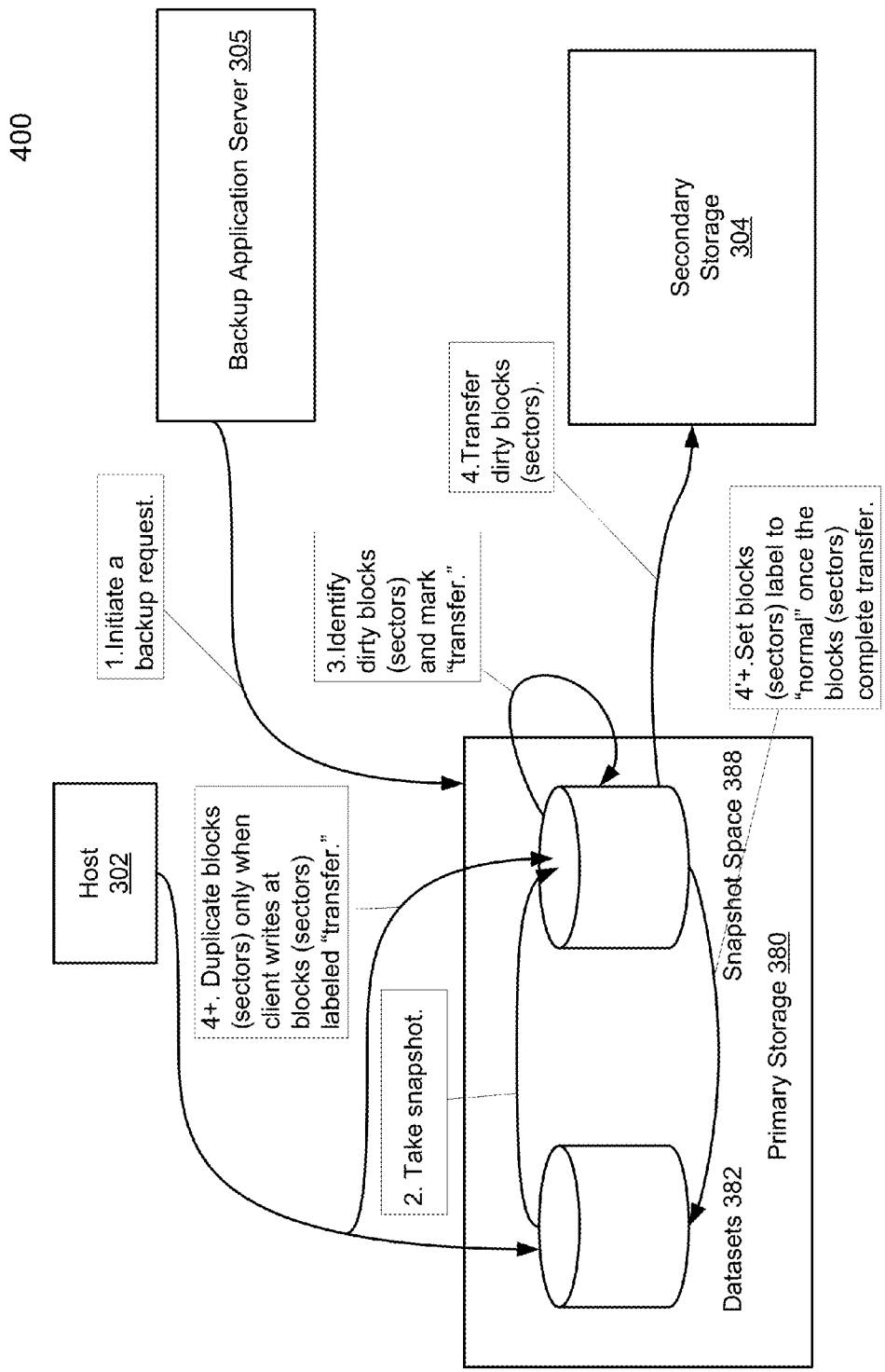
FIG. 4A is a block diagram illustrating an incremental backup process using a second set of embodiments of the invention at a primary storage.

FIG. 4A is a block diagram illustrating an incremental backup process using a second set of embodiments of the invention at a primary storage. Task boxes 1 to 4 illustrate the order in which operations are performed according to one embodiment of the invention. System 400 is similar to system 100 in FIG. 1 and the same or similar references indicate elements or components having the same or similar functionalities. The connectivity between various entities and modules within entities are omitted in FIG. 4A to leave space to discuss the incremental backup process more clearly. The process starts at backup application server 305 with a request for a backup of host 302. The backup request may be for an incremental backup in some embodiment, and the backup request may be for a full backup in another embodiment.

Primary storage 380 receives the request. In one embodiment, the request comes from a user directly through a user interface. In another embodiment, the request comes from secondary storage 304 or primary storage 380 itself based on a backup schedule. After receiving the request, primary storage 380 decides to initiate an incremental backup (for example, through data protection logic 184 of FIG. 1). Primary storage may decide so even if the backup request does not explicitly requests for an incremental backup. At task box 2, a snapshot is captured to establish a consistent state of datasets within primary storage 380. The datasets are represented by datasets 382. The resulting snapshot is saved at snapshot space 388.

At task box 3, dirty blocks within the snapshots are identified. Similar to the embodiments of dirty dataset duplication, identifying dirty blocks is not a separate process in some embodiments; rather, it is a part of processing host write requests by the primary storage. In other words, identification of dirty blocks may happen prior to or concurrently with a backup request is received at primary storage 380. The identification of dirty blocks may be achieved through a variety of ways. For example, a variety of data structures such as a bit vector or a table (e.g., hash table, tree, or array) may be used to track dirty blocks within primary storage 380. A change tracker like change tracker 186 may be used to store the status of blocks within primary storage 380 by implementing the aforementioned variety of data structures. Similar to the embodiments of dirty dataset duplication, in some embodiments, two data structures may be used to store the status of blocks: A past change tracker (PCT) stores the status of blocks before the starting of transferring of blocks and a current change track (CCT) stores the status of blocks at the present backup interval. When a block within primary storage 380 has been changed since a previous backup (e.g., the last backup) but before the starting of transferring of blocks, the status of the block will be labeled with "transfer" in the PCT, indicating that the block needs to be transferred to secondary storage 304. If a block has not changed since a previous backup and before the starting of transferring of blocks, the status of the block will be labeled with "normal" in the PCT. By checking the status of all the blocks, dirty blocks are identified at task box 3. Note that at the starting of transferring, the status of CCT for all blocks are "normal" as no host write has occurred yet (thus no change has been recorded).

Onward to task box 4, dirty blocks are transferred to secondary storage 304. After transfer starts and before transfer completes, host 302 may continue writing to primary storage 380. Since the write happens after transfer starts at task box 4, "4+" and "4'+" are used to denote post transfer initiation actions. Task boxes 4+ and 4'+ may happen in a not-fixed order. Sometimes task box 4+ happens earlier than task box 4'+ yet the opposite can be true too, because task box 4+ is initiated externally based on a host request. At task box 4+, a write to a yet-to-transfer dirty block (which is labeled with "transfer" in the PCT) will trigger a data content preservation action to snapshot space 388 while the block is written to Dataset 382. A write to an unchanged block or a transferred dirty block (both the unchanged and the transferred dirty blocks are labeled with "normal" in the PCT) does not trigger a data content preservation action according to one embodiment, since an unchanged block or a transferred dirty block will not be transferred to the secondary storage. Note the removal of a data content preservation action for unchanged blocks or transferred blocks differentiates the embodiment of a backup process illustrated in FIG. 5 from an agnostic copy-on-write process illustrated at references 226 and 228 in FIG. 2 and embodiments of dirty dataset duplication illustrated in FIG. 3 where transferred blocks still trigger data content preservation actions. In one embodiment, the data content preservation action is performed via a copy on write operation, and in another embodiment, the data content preservation action is performed via a redirect on write operation. At task box 4'+, after a dirty block is transferred, the status of the block will be labeled with "normal" in the PCT. The statuses of dirty blocks in the PCT change throughout the transfer period—gradually all change from "transfer" to "normal." At the same time, host writes to the blocks will trigger a labeling of the blocks to "transfer" in the CCT. That is, a block labeled with "normal" in the CCT (which is for all blocks at the beginning of the backup interval) will be relabeled with "transfer" once there is a write to the block, whether the write is within the transfer period or not. This type of incremental backup is referred to as in-time dirty dataset duplication as only dirty dataset in the time before transferring triggers duplication during an incremental backup. Note, if the current backup interval is backup interval N, at a backup immediately follows the current backup (referred to as backup interval N+1), the PCT of backup interval N will become a current change tracker for backup interval N+1 as it has been reset to "normal" after the transfer period at backup N. The former PCT of backup interval N now can be used to track changes during backup interval of backup N+1. The CCT for backup interval N switches its role and becomes a PCT of backup interval N+1 as it has records of all changes during the backup interval of backup N+1. The roles between the two trackers alternate in the following backup intervals.

Note the embodiment uses blocks to illustrate the operation of incremental backup. The invention is not so limited. For example, the process can be operated at sector level, where changes of sectors from a previous backup are tracked and a data content preservation action happens only when a host writes to a yet-to-transfer dirty sector during a transfer period. Similar to operation on blocks, the labels on the sectors are reset to "normal" in a PCT for all sectors gradually throughout a transfer period.

Figure 4B:
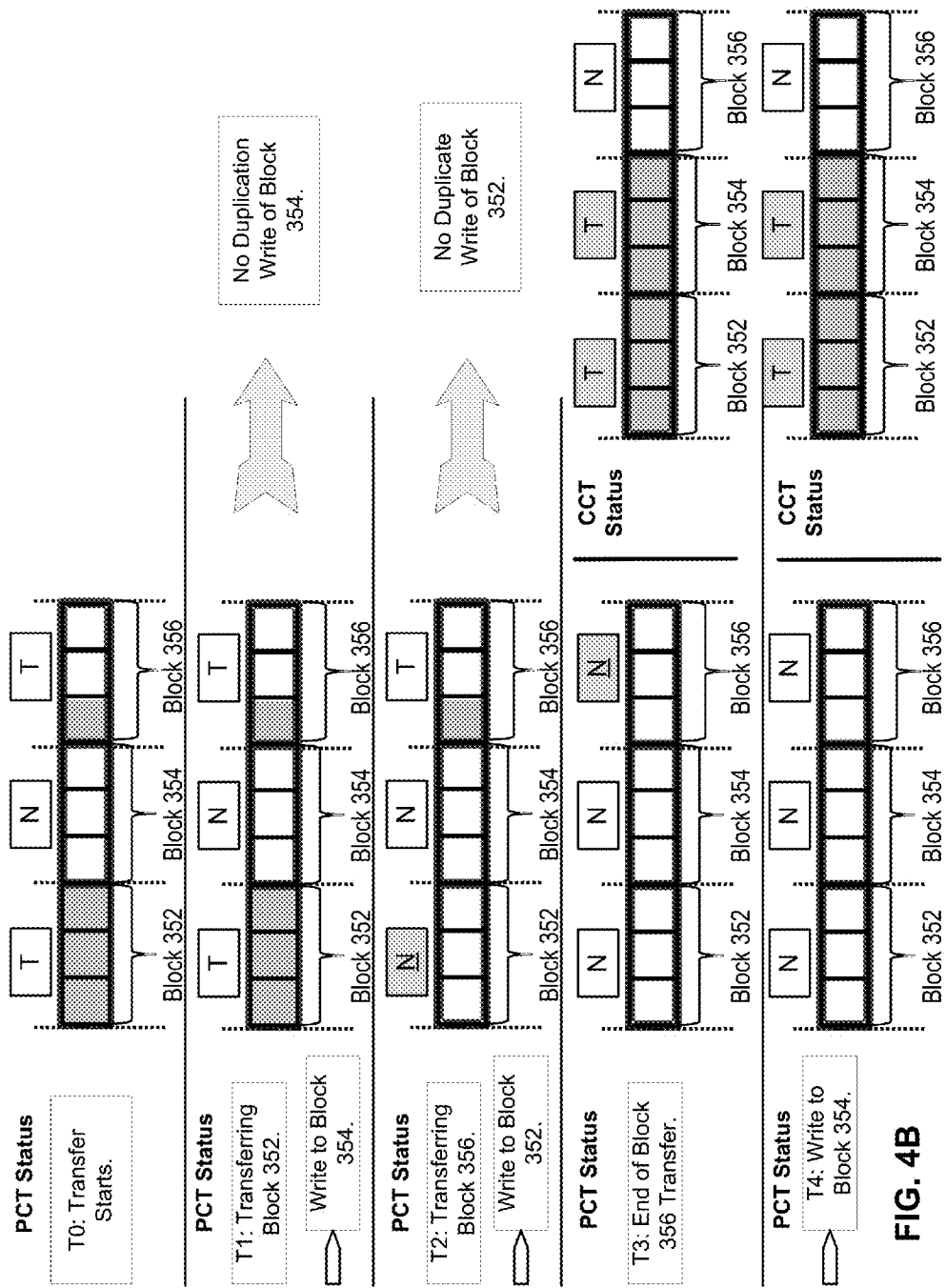
FIG. 4B is another block diagram illustrating an incremental backup process using the second set of embodiments of the invention at a primary storage.

FIG. 4B is another block diagram illustrating an incremental backup process using the second set of embodiments of the invention at a primary storage. FIG. 4B focuses on illustrating changes of status labels of blocks in a PCT and a CCT associated with a primary storage. At time T0, incremental backup triggered block transfer starts. At time T0, block 352 is labeled with "transfer" ("T"), block 354 is labeled with "normal" ("N"), and block 356 is labeled with "transfer" at the PCT. The status for all blocks in the CCT is "normal" at time T0 (not shown). At time T1, block 352 is transferring to a secondary storage and a host requests a write to block 354. Because block 354 is labeled with "normal" in the PCT, the write does not trigger a data content preservation action of block 354. However, the write to block 354 triggers the CCT status of block 354 changes from "normal" to "transfer" (not shown). Then at time T2, block 352 has been transferred already and block 356 is getting transferred to the secondary storage system and a host requests write to block 352. After block 352 finishes transferring to a secondary storage, the status of block 352 changes from "transfer" to "normal" in the PCT; therefore, the write does not trigger a data content preservation action of block 352. At the same time, the write to block 352 triggers the CCT of block 352 changes from "normal" to "transfer" (not shown). At time T3, transfer of block 356 completes, and the status of block 356 changes from "transfer" to "normal" in the PCT, and the incremental backup is done. For CCT, since blocks 352 and 354 have been written during the transfer period, the labels of blocks 352 and 354 are changed to "transfer" as shown. At time T4, a host writes to block 354, and the write does not trigger block 354 to change label in the CCT since it has been in "transfer" state in the CCT already. At time T4, the PCT for all blocks remains "normal." As discussed herein above, the PCT will become a CCT in the next backup interval and the status of blocks in the new CCT may be changed after the next backup interval starts and host write requests come in. Because the writes at both time T1 and time T2 do not trigger a data content preservation action, the performance characteristics of the primary storage increase as two less I/O operation and less storage space are required.

In another embodiment, the labeling can be done by at a sector level, in which case, all 9 sectors of blocks 352-356 have individual "transfer" and "normal" labels, which take more processing resource to manage. At the same, the process may save more data content preservation actions as some blocks have only a portion being dirty (e.g., block 356 has only one dirty sector), and writes to "normal" sectors and transferred sectors do not trigger data content preservation actions, thus making data content preservation decision at a sector level may further reduce data content preservation actions.

Embodiments of Backup Methods Viewed from Primary Storage

Figure 5:
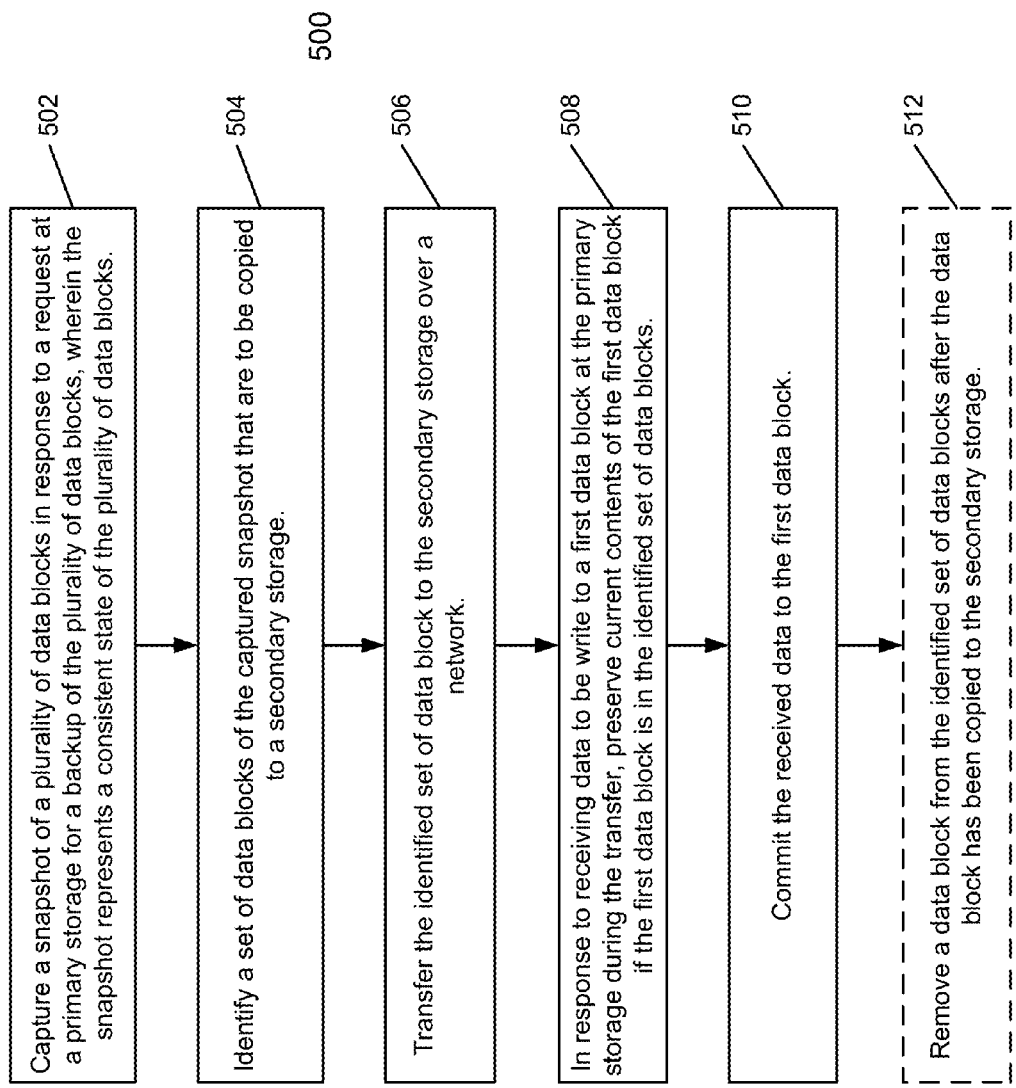
FIG. 5 is a flow diagram illustrating a method of backing up according to one embodiment of the invention.

FIG. 5 is a flow diagram illustrating a method of backing up according to one embodiment of the invention. Method 500 may be implemented on a primary storage such as primary storage 180. At reference 502, the method starts with capturing a snapshot of a plurality of data blocks in response to a request at a primary storage for a backup of the plurality of data blocks. The snapshot represents a consistent state of the plurality of data blocks. In one embodiment, the request comes from a user directly through a user interface. In another embodiment, the request comes from a backup application server, a secondary storage system or the primary storage itself based on a backup schedule. At reference 504, a set of data blocks of the captured snapshot are identified to be copied to a secondary storage. At reference 506, the identified set of data blocks are being transferred to the secondary storage. The identified set of data blocks are transferred to a secondary storage like backup storage system 104 in FIG. 1. In one embodiment, the backup storage system is a deduplicating storage system. After transfer starts, a host may continue writing to the blocks within the primary storage. At reference 508, in response to receiving data to be written to a first data block at the primary storage during the transfer, preserving the current contents of the first data block if the first data block is in the identified set of data blocks. Then at reference 510, the received data is committed to the first data block. Optionally, a data block from the set of data blocks is removed from the set of data blocks after the block has been copied to the secondary storage.

In one embodiment, the identified set of data blocks at reference 504 includes all the data blocks of the captured snapshots, thus the backup is a full backup. In another embodiment, the identified set of data blocks at reference 504 is a set of data blocks that have been changed since a previous backup (e.g., the last backup), thus the backup is an incremental backup. The changed data blocks are referred to as dirty data blocks as discussed herein above. The dirty data blocks may be identified in a variety of ways. In one embodiment, a variety of data structures such as a bit vector or a table (e.g., hash table, tree, or array) may be used to track dirty data blocks within the primary storage. In one embodiment, two change trackers can be implemented, one stores block statuses based on changes prior to the starting of block transfer of a backup interval and the other stores block statuses based on changes after the starting of block transfer and during the backup interval. In another embodiment, a comparison such as a "diff" operation of the datasets against a consistent state of the datasets associated with a previous backup can determine the change since the last backup. A change tracker module such as change tracker 186 in FIG. 1 may be utilized to identify the dirty datasets. The change tracker may label a data block either with "transfer" or "normal." In some embodiments, marking of dirty data blocks from the transfer state to the normal state is performed after all dirty data blocks have been transferred from the primary storage to the secondary storage, and these kinds of embodiments use the first set of embodiments of the invention as we discussed herein above. In some other embodiments, when a particular dirty data block has been transferred from the primary storage to the secondary storage, that particular dirty data block is marked from the transfer state to the normal state, while remaining dirty data blocks are still being transferred. These kinds of embodiments use the second set of embodiment of the inventions as we have discussed herein above. Note each block contains multiple sectors, and marking can be done at a sector level. When marking is done at a sector level, a primary storage needs to track the states of sectors, and that takes more computing resource and storage space, but one of the benefits is that data content preservation actions may be reduced as some dirty blocks have only a portion of the sectors within it changed, and writes to the unchanged sectors will not trigger data content preservation actions.

In one embodiment, preserving the current contents of the first data block at the primary storage during transfer at reference 508 includes copying the current contents of the first data block to an alternate data block in the primary storage. For example, the alternate data block may be at a snapshot space of the primary storage. The operation may be performed by the copy-on-write action discussed herein above. In another embodiment, the preservation at reference 508 includes writing the received data to an alternate data block in the primary storage. For example, the alternate data block may be appended to a log. The operation may be performed by the redirect-on-write action discussed herein above.

Note that both the first and second sets of embodiments of the invention can also be used when the secondary storage is not a backup storage system. For example, a primary storage may use embodiments of the invention to provide replica of the primary storage at a secondary storage. For another example, the secondary storage may be used to provide snapshot repositories of a primary storage. For another example, the secondary storage may be used to provide archival storage. In addition, the secondary storage may be used to make secondary copies of data, e.g., cloning a dataset to perform test and development. In each embodiment, the invention reduces overhead writes and thus improves efficiency of data transfer.

FIGS. 6A-B are diagrams illustrating computer simulation results comparing embodiments of the inventions and embodiments of baseline operations without this invention. FIG. 6A shows computer simulation results of percentages of volume capacity of copy-on-write. The "baseline" results are the results for operations without implementing any of the embodiments disclosed herein above, i.e., both normal and dirty datasets cause copy-on-write. The "dirty" results are the results for operations implementing the first set of embodiments of the invention at a block level, and "dirty+time" are the results for operations implementing the second set of embodiments of the invention at a block level. The computer simulation shows that in all backup intervals (from 15 minutes to 12 hours) and different block sizes (512 bytes and 1M bytes), the second set ("dirty+time") causes less copy-onwrite than the first set ("dirty"), and the first set causes less copy-on-write than baseline operations ("baseline"). FIG. 6B shows computer simulation results of percentages of host write causing copy-on-write. For baseline operations, the percentages trend down as backup intervals increases, while the percentages for the first set ("dirty") and the second set ("dirty+time") trend up initially and remains at roughly constant levels. The percentages of host write causing copy-on-write for the first set and the second set are both at much lower than the percentages for baselines at different sector sizes (512 bytes and 1M bytes).

A Third Set of Embodiments of the Invention

Figure 7:
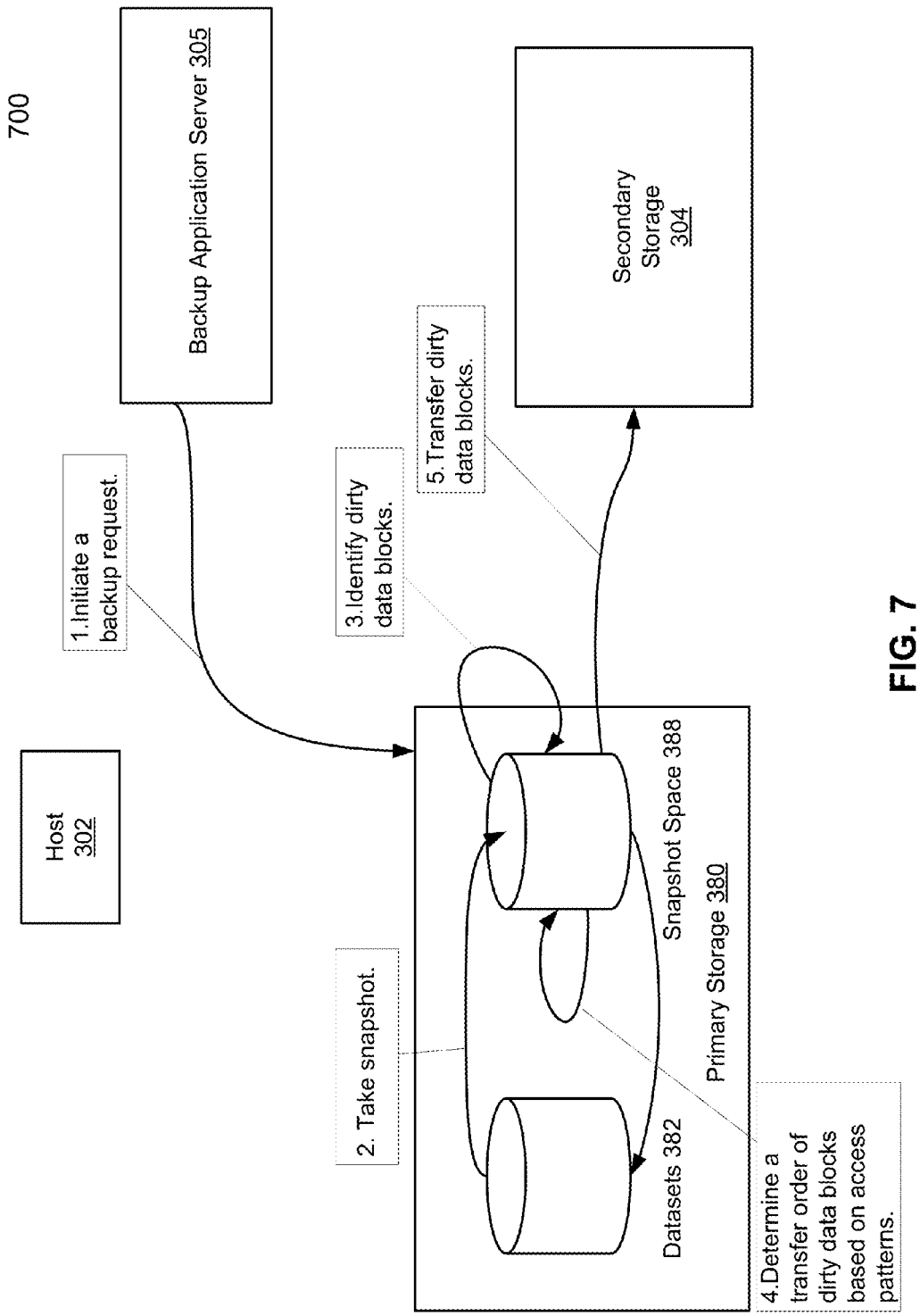
FIG. 7 is a block diagram illustrating an incremental backup process using a third set of embodiments of the invention at a primary storage.

FIG. 7 is a block diagram illustrating an incremental backup process using a third set of embodiments of the invention at a primary storage. The first and second sets of embodiments of the invention do not change a sequential logical order of dirty datasets in the primary storage during dataset transfer. The sequential logical orders of dirty data blocks are generally provided by primary storage, and they may be based on logical address, physical address, or any other fixed order. When the dirty data blocks are assigned to a transfer order different from the sequential logical order based on, for example, an access assessment of the dirty datasets, further saving on input/output operations may be achieved and less storage space may be needed.

Task boxes 1 to 5 illustrate the order in which operations are performed according to one embodiment of the invention. System 700 is similar to system 300 in FIG. 3A and the same or similar references indicate elements or components having the same or similar functionalities. The connectivity between various entities and modules within entities are omitted in FIG. 7 to leave space to discuss the incremental backup process more clearly. The process starts at backup application server 305 with a request for a backup of host 302. Primary storage 380 receives the request. In one embodiment, the request comes from a user directly through a user interface. In another embodiment, the request comes from secondary storage 304 or primary storage 380 itself based on a backup schedule. Note in some embodiments, the user may request a full backup or an incremental backup, and primary storage 380 decides whether full datasets or changed datasets only are transferred (e.g., primary storage 380 may decide to transfer changed datasets only when the secondary storage has an earlier backup of the datasets and only changed datasets are needed to fully reconstruct the datasets at the secondary storage). At task box 2, a snapshot is captured to get a consistent state of data blocks of the datasets within primary storage 380. The data blocks are represented by datasets 382. The resulting snapshot is saved at snapshot space 388. Note that taking snapshot is not a mandatory step prior to assigning a transfer order of data blocks, the data blocks can be assigned to a transfer order different from a sequential logical order without taking a snapshot. At task box 3, dirty data blocks within the snapshots are identified. The identification of dirty data blocks may be achieved through a variety of ways. For example, a variety of data structures such as a bit vector or a table (e.g., hash table, tree, or array) may be used to track dirty data blocks within primary storage 380. A change tracker like change tracker 186 may be used to store the status of datasets within primary storage 380. When a data block with primary storage 380 has been changed since a previous backup, the status of the data block will be labeled with "transfer," indicating that the data block needs to be transferred to secondary storage 304. If a data block has not been changed since a previous backup, the status of the data block will be labeled with "normal." By checking the status of all the data blocks, dirty data blocks are identified at task box 3. Then at task box 4, a transfer order of the dirty data blocks different from a sequential logical order of the primary storage is determined based on an access assessment of the dirty data blocks. At task box 5, snapshot associated with the dirty datasets are transferred according to the determined transfer order to secondary storage 304. Note during dirty data block transfer, the primary storage may still use the first and second set of embodiments of the invention to further reduce data content preservation actions. In other words, the transfer order determination (the third set of embodiments of the invention) may be used in combination of the first or the second set of embodiments of the invention for backup. In addition, not only dirty blocks, but also dirty sectors and logical units can be determined to be transferred in a transfer order different from a logical sequential order of the primary storage according to system 700. In one embodiment, secondary storage 304 is a backup storage system. In other embodiment, secondary storage 304 may be a replica of primary storage 380 or snapshot repository of primary storage 380, or other types of secondary storages.

Figure 8:
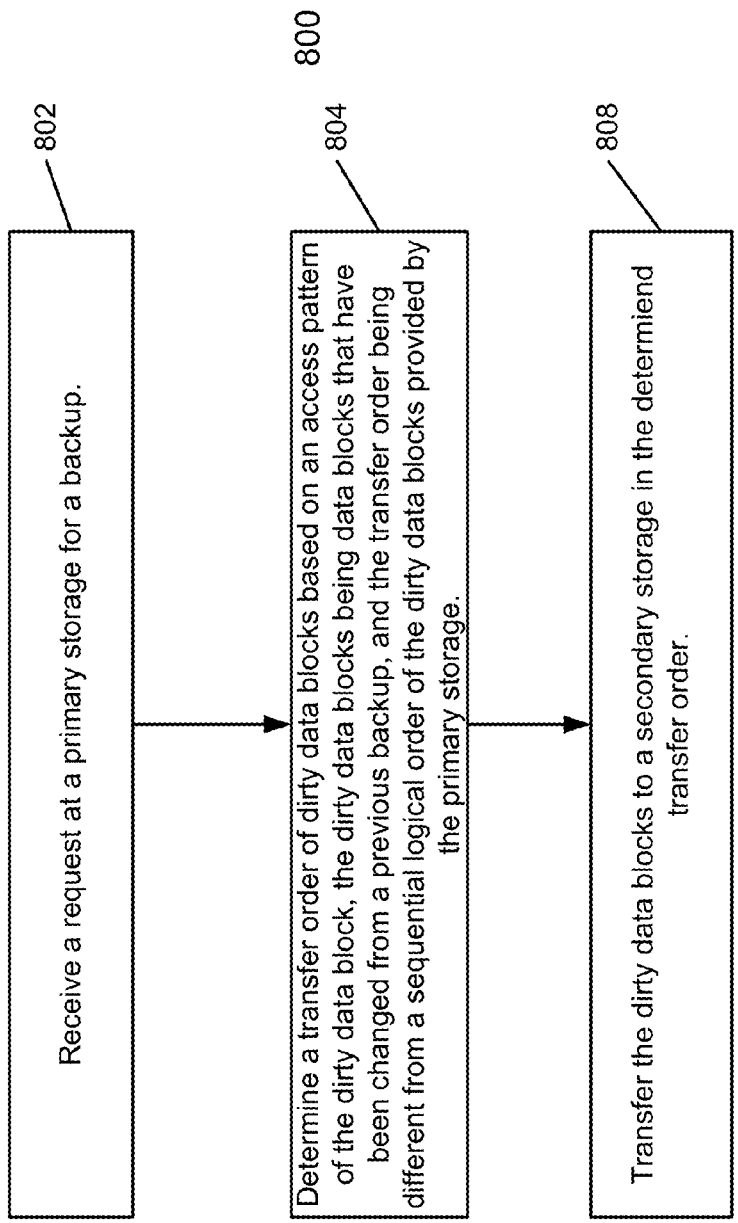
FIG. 8 is a flow diagram illustrating a method of incremental backup process using the third set of embodiments of the invention at a primary storage.

FIG. 8 is a flow diagram illustrating a method of backup process using the third set of embodiments of the invention at a primary storage. Method 800 may be implemented on a primary storage such as primary storage 180. At reference 802, the method starts with receiving a request for a backup of a number of data blocks at a primary storage. In one embodiment, the request comes from a user directly through a user interface. In another embodiment, the request comes from a backup application server, a secondary storage or the primary storage itself based on a backup schedule. Then at reference 804, the method determines a transfer order of dirty data blocks based on an access pattern of the dirty data blocks. The dirty blocks are data blocks that have been changed from a previous backup (e.g., the last backup). The dirty data blocks may be identified in a variety of ways. In one embodiment, a variety of data structures such as a bit vector or a table (e.g., hash table, tree, or array) may be used to track dirty data blocks within the primary storage. In another embodiment, a comparison such as a "diff" operation of the data blocks against a consistent state of the data blocks associated with a previous backup can determine the change since the last backup. A change tracker module such as change tracker 186 in FIG. 1 may be utilized to identify the dirty data blocks. The change tracker may label a data block either with "transfer," which means that the data block has been changed since a previous backup and thus needs to be transferred; or the change tracker may label the data block with "normal," which means that the data block has not been changed thus no transfer is required. The determined transfer order at reference 804 is different from a sequential logical order of the dirty data blocks determined by the primary storage. The dirty data blocks are then transferred to a secondary storage system such as backup storage system 104 in FIG. 1 in the determined transfer order at reference 808. In one embodiment, the secondary storage system is a deduplicating storage system. In some embodiment, a consistent state of the reordered dirty data blocks is established by capturing a snapshot of the dirty data blocks, and the snapshot is transferred to the secondary storage system. In some embodiment, after transfer starts, the primary storage may use the first and second sets of embodiments of the invention discussed herein above to further reduce transfer overhead.

Figure 9:
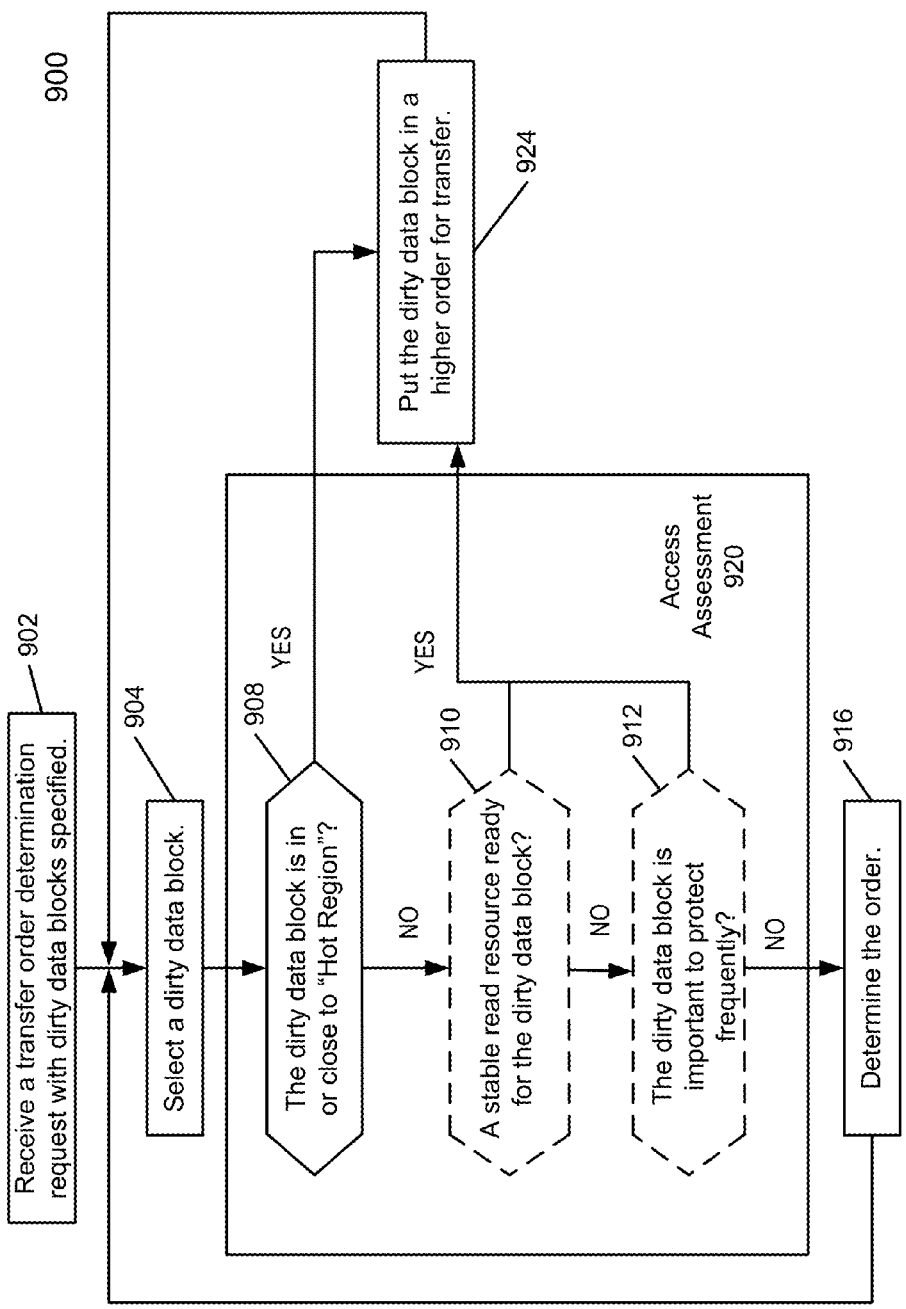
FIG. 9 is a flow diagram illustrating a method according to the third set of embodiments of the invention.

FIG. 9 is a flow diagram illustrating a method according to the third set of embodiments of the invention. Method 900 may be implemented on a primary storage such as primary storage 180, and more specifically at transfer order determinator module 188, which may be implemented as processing logic in software, hardware, or a combination thereof. The method starts at reference 902 where a transfer order determination request is received with dirty data blocks being specified. A dirty data block is selected at reference 904. Then a determination is made about whether the dirty data block is in or close to a hot region at reference 908. If the dirty data block is in or close to a hot region, the dirty data block is put in a higher order for transfer at reference 924, otherwise optionally the method proceeds to the next determination. The determination of a dirty data block being in or close to a hot region will be discussed in more detail herein below in connection with FIG. 10.

At reference 910, the determination is whether a stable read resource is ready for the dirty data block. The readiness for transfer may be determined by read resources within the primary storage. For example, a logical unit may span multiple devices such as hard drives in a RAID configuration. If a device is busy, a read may take longer than a different hard drive that is less busy. Data blocks can be ordered to balance read operations and minimize wait times. Data block transfers may be handled in parallel by reading multiple devices simultaneously and transferring whatever data block is retrieved first. Read time can vary based on device characteristics. In general, FLASH devices are faster than SAS (serial attached SCSI (small computer system interface)) drives, which are faster than SATA (serial ATA (AT Attached) drives, which are faster than tape. Determining transfer order of data blocks can inter-mix reads to each device based on expected response time. In addition, dirty data blocks may exist on devices that have different protection categories, and it is important to transfer dirty data blocks on less-stable storage before dirty data blocks on more-stable storage. As an example, in order from least stable to most stable, read resources are RAM, NVRAM, and hard drive. When a stable read resource is ready for the dirty data block, the dirty data block is put in a higher order for transfer at reference 924; a less stable read resource being ready for the dirty data block may result in the dirty data block in a lower order but still higher than the current order of the dirty data block, and the data block may be kept in the current order when neither is ready.

Optionally the method may continue and determine the importance of the dirty data block at reference 912. The importance of a dirty data block may be specified through metadata provided by a system administrator. One example is that the administrator knows that certain data blocks are devoted to file system free block maps and must be protected frequently, thus if dirty data blocks are one of the certain data blocks, those dirty data blocks may be given a higher order in transfer. In addition, the importance of dirty data blocks may be based on the frequency of reads of the dirty data blocks besides the frequency of writes of the dirty data blocks. A frequently read data block is more important to transfer than a less frequently read data blocks, thus a frequently read dirty data block should be put in a higher order to transfer than a less frequently read dirty data blocks. If the dirty data block is not important, then at reference 916, the method determines the transfer order of the data block, and the method go back to reference 904 to select another data block. The method iterates until all dirty data blocks are processed through the method.

Note that determining a transfer order may be based on logical units as well as sectors and blocks. For example, a logical unit could be on a lightly loaded hard drive that can be transferred more efficiently than a logical unit on a heavily loaded hard drive, thus the former logical unit should be transferred first. For another example, one logical unit may be devoted to storing customer orders, which should be protected with higher priority than a logical unit devoted to temporary scratch space.

Note that the references 908-912 in combination is grouped as access assessment reference 920. Access assessment may include one or more blocks of references 908-912 depending on configuration of a primary storage, the need to determining transfer order of dirty data blocks, available resources, and other factors. In addition, the order of references 908-912 are for illustration only and other orders are possible to implement method 900 as disclosed.

Figure 10:
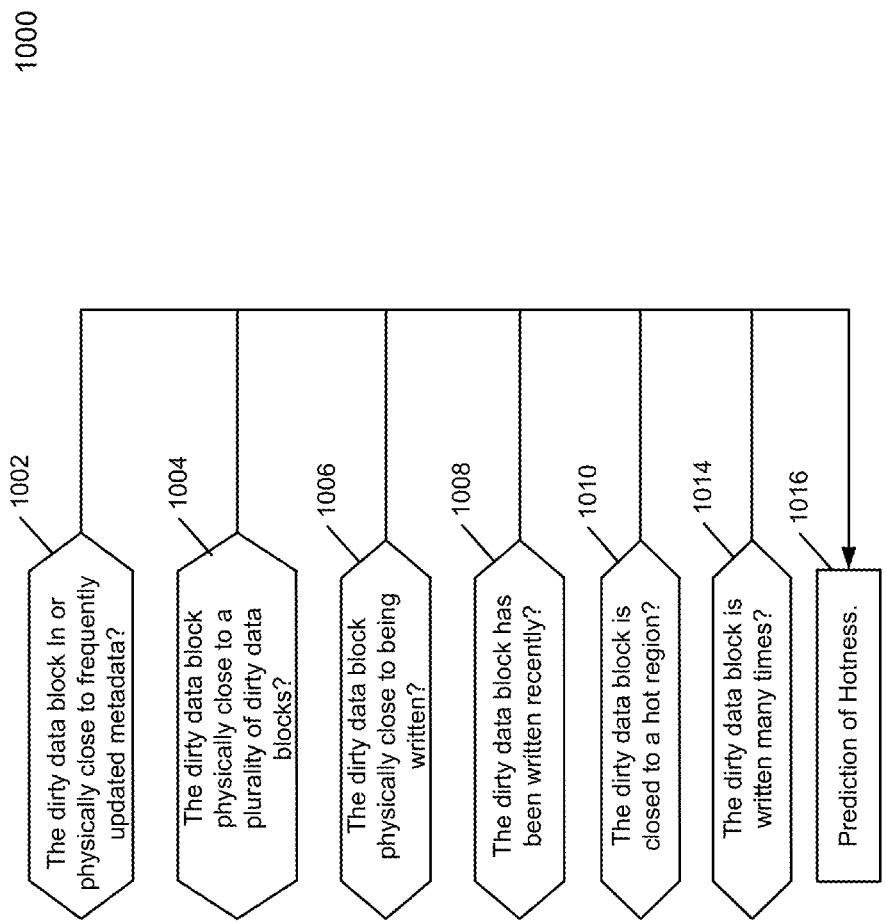
FIG. 10 is a flow diagram illustrating a method of determining whether a dirty data block is in or close to a hot region within a primary storage according to one embodiment of the invention.

FIG. 10 is a flow diagram illustrating a method of determining whether a dirty data block is in or close to a hot region within a primary storage according to one embodiment of the invention. Method 1000 may be implemented on a primary storage such as primary storage 180, and more specifically at transfer order determinator 188, which may be implemented as processing logic in software, hardware, or a combination thereof. The determination starts at reference 1002, and the method determines whether or not a selected dirty data block is within or physically close to a region of frequently updated metadata. Metadata for a file system or a database is updated more frequently than other data blocks, thus they should be put in a high order in transfer when they are dirty. If the dirty data block is in a frequently updated metadata region, the method determines that the dirty data block is in a hot region at reference 1016. As illustrated in FIG. 9, a dirty data block in a hot region may be put in a higher order in transferring during a backup period. The method then determines whether or not the dirty data block is physically close to a number of dirty data blocks at reference 1004. When a dirty data block is physically closed to other dirty data blocks, since all the dirty data blocks need to be transferred, it may be more efficient to put all the closely situated dirty data blocks together while transferring, thus the method determines that the dirty data block is in a hot region at reference 1016.

The method determines whether or not the dirty data block is physically close to being written at reference 1006. The method prioritizes a dirty data block that is ahead of application I/O. For example, consider application I/O to a block 20. A primary storage should prioritize transfer of block 21 and greater with a higher priority than block 20 and lower. The rationale is that many applications have sequential write patterns and will tend to write to consecutively increasing blocks in the near future, thus block 21 and higher are close to being written and need to be transferred in a high order. The method then determines whether or not the dirty data block has been written recently at reference 1008. A data block that is written recently may need to be transferred with a higher priority because it is likely to be written in the near future. This is a version of temporal hotness. An opposite decision may also be made based on the rationale that a block written farther in the past is more stable and thus there is value in protecting the stable value over a frequently changed value and thus a data block that has not been written recently may need to be transferred with a higher priority. The opposite decisions may be implemented in different embodiments of the invention. In addition, if the dirty data block is not in a hot region, the method may determine whether or not the dirty data block is close to a hot region at reference 1010. If the dirty data block is close to a hot region, it may be determined to be hot too. The rationale is that regions near hot regions are more likely to be written than regions far from hot regions, thus hotness values should have a smoothness locally. Furthermore, the hotness prediction may be based on the number of times a dirty data block being written during a period of time at reference 1014.

The dirty data block being written more often will be deemed hot and thus be transferred in a high order.

Note one or more of references 1002-1014 may be used to make hotness determination. The inclusion of one or more references 1002-1014 depends on configuration of a primary storage, the need to determine hotness of dirty data blocks, resources available for determining hotness of dirty data blocks, and other factors. In addition, the order of references 1002-1014 are for illustration only and other orders are possible to implement method 1000 as disclosed.

Figure 11:
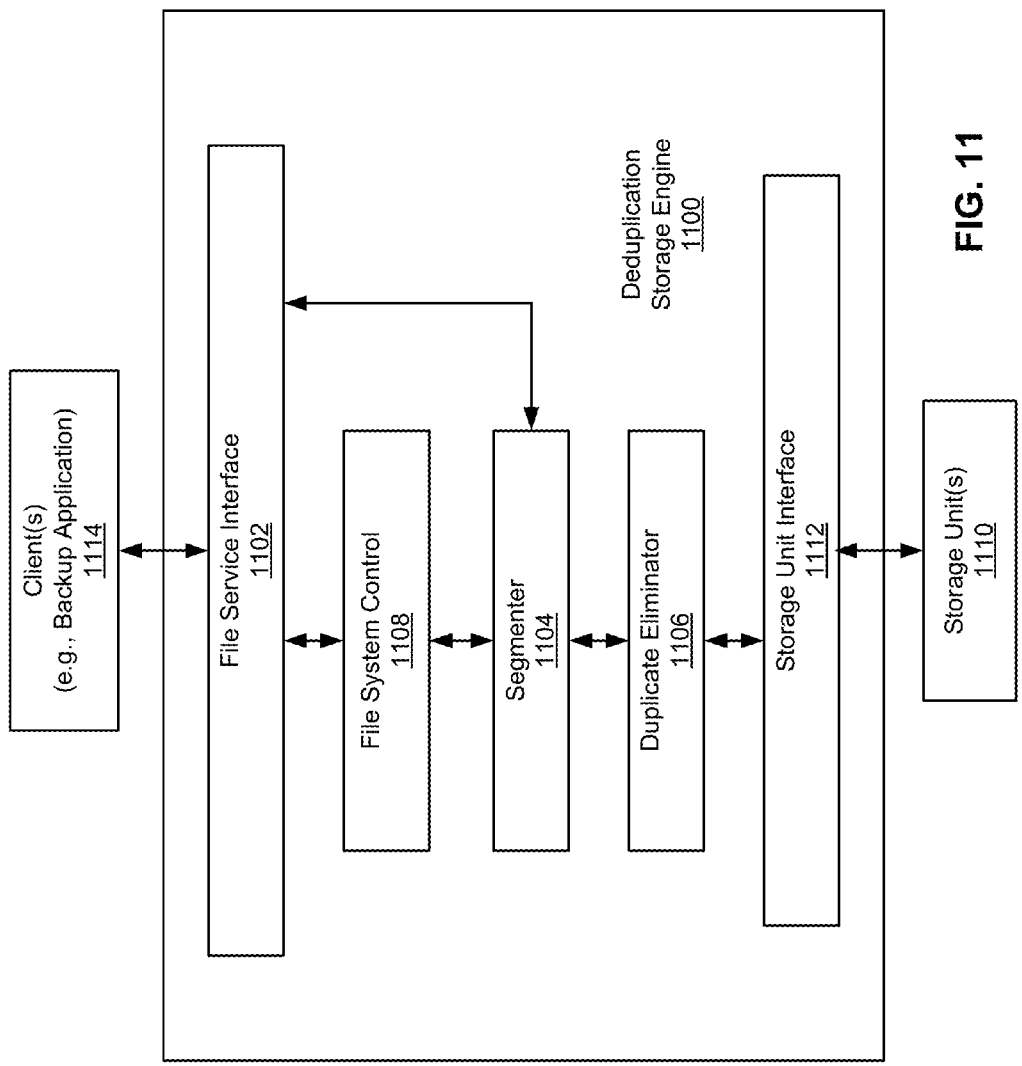
FIG. 11 is a block diagram illustrating a segment storage engine according to one embodiment of the invention.

FIG. 11 is a block diagram illustrating a segment storage engine according to one embodiment of the invention. For example, deduplication storage engine 1100 may be implemented as part of a deduplication storage system as described above, such as deduplication storage engine 107 of FIG. 1. Referring to FIG. 11, in one embodiment, deduplication storage engine 1100 includes file service interface 1102, segmenter 1104, duplicate eliminator 1106, file system control 1108, and storage unit interface 1112. Deduplication storage engine 1100 receives a file or files (or dataset(s)) via file service interface 1102, which may be part of a file system namespace of a file system associated with the deduplication storage engine 1100. The file system namespace refers to the way files are identified and organized in the system. An example is to organize the files hierarchically into directories or folders. File service interface 1102 supports a variety of protocols, including a network file system (NFS), a common Internet file system (CIFS), and a virtual tape library interface (VTL), etc.

The file(s) is/are processed by segmenter 1104 and file system control 1108. Segmenter 1104 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1108 processes information to indicate the segment(s) association with a file. In some embodiments, a list of fingerprints is used to indicate segment(s) associated with a file. File system control 1108 passes segment association information (e.g., representative data such as a fingerprint) to an index (not shown). The index is used to locate stored segments in storage units 1110 via storage unit interface 1112. Duplicate eliminator 1106 identifies whether a newly received segment has already been stored in storage units 1110. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1110 that make up the file. Segments are then packed by a container manager (not shown) into one or more storage containers stored in storage units 1110. The deduplicated segments may be further compressed using a variation of compression algorithms, such as a Lempel-Ziv algorithm before being stored.

When a file is to be retrieved, file service interface 1102 is configured to communicate with file system control 1108 to identify appropriate segments stored in storage units 1110 via storage unit interface 1112. Storage unit interface 1112 may be implemented as part of a container manager. File system control 1108 communicates with an index (not shown) to locate appropriate segments stored in storage units via storage unit interface 1112. Appropriate segments are retrieved from the associated containers via the container manager and are used to construct the requested file. The file is provided via interface 1102 in response to the request. In one embodiment, file system control 1108 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving a request at a primary storage for a backup of a plurality of data blocks to a secondary storage, the plurality of data blocks comprising a plurality of dirty data blocks, wherein a dirty data block comprises a data block that has changed since a previous backup of the data block;
   backing up the plurality of dirty data blocks to the secondary storage, wherein the backing up comprises:
      determining a transfer order of the dirty data blocks wherein a dirty data block is given a higher priority for transfer based on a proximity of the dirty data block to a hot region on the primary storage, and wherein the transfer order is different from a sequential logical order of the dirty data blocks provided by the primary storage; and
      transferring the dirty data blocks to the secondary storage in the determined transfer order, wherein the secondary storage is a deduplication storage system.

2. The method of claim 1, wherein a dirty data block is in proximity to the hot region of the primary storage based on at least one of:
   the dirty data block is physically close to a frequently accessed region of the primary storage;
   the dirty data block is physically close to another dirty data block on the primary storage;
   the dirty data block is physically close to a data block being written to primary storage;
   the dirty data block is physically close to a region of the primary storage that frequently changes state, or
   the dirty data block is physically close a number of dirty data blocks on the primary storage.

3. The method of claim 1, wherein an access assessment of a dirty data block is determined based on readiness of a stable read resource for the dirty data block.

4. The method of claim 1, wherein a dirty data block is given a higher priority based on at least one of:
   the dirty data block is physically close to a region of the primary storage containing frequently updated metadata;
   contents of the dirty data block containing metadata about a file having one or more dirty data blocks.

5. The method of claim 1, further comprising capturing a snapshot of the plurality of data blocks, wherein the snapshot represents a consistent state of the plurality of data blocks.

6. The method of claim 1, further comprising:
   identifying the dirty data blocks by marking each data block in a transfer state if the data block is dirty and marking each data block in a normal state if the data block is not dirty, wherein only data blocks in the transfer state are transferred to the secondary storage; and
   marking the dirty data blocks in the normal state after the dirty data blocks have been transferred to the secondary storage.

7. The method of claim 6, wherein markings of the data blocks are stored in a bit vector having a plurality of bits, each corresponding to one of the data blocks, wherein a bit having a first logical value indicates that the corresponding data block is dirty, and wherein a bit having a second logical value indicates that the corresponding data block is not dirty.

8. The method of claim 6, wherein markings of the data blocks are stored in a bit vector having a plurality of bits, each corresponding to one of the data blocks, wherein a bit having a first logical value indicates that the corresponding data block is the transfer state, and wherein a bit having a second logical value indicates that the corresponding data block is in the normal state.

9. The method of claim 6, further comprising:
   in response to receiving data to be written to a first data block at the primary storage during the transfer,
   preserving current contents of the first data block if the first data block is in the identified set of data blocks; and
   committing the received data to the first data block.

10. The method of claim 6, wherein marking of dirty data blocks from the transfer state to the normal state is performed after all dirty data blocks have been transferred from the primary storage to the secondary storage.

11. The method of claim 6, wherein when a particular dirty data block has been transferred from the primary storage to the secondary storage, that particular dirty data block is marked from the transfer state to the normal state, while remaining dirty data blocks are still being transferred.

12. The method of claim 1, wherein the secondary storage is one of: a backup storage system, a replica of the primary storage, an archival storage system, and a snapshot repository of the primary storage.

13. A non-transitory computer-readable storage medium having instructions stored therein, which when executed by a processor, cause the processor to perform a method, the method comprising:
   receiving a request at a primary storage for a backup of a plurality of data blocks to a secondary storage, the plurality of data blocks comprising a plurality of dirty data blocks, wherein a dirty data block comprises a data block that has changed since a previous backup of the data block;
   backing up only the plurality of dirty data blocks to the secondary storage, wherein the backing up comprises:
      determining a transfer order of the dirty data blocks wherein a dirty data block is given a higher priority for transfer based on a proximity of the dirty data block to a hot region on the primary storage, and wherein the transfer order is different from a sequential logical order of the dirty data blocks provided by the primary storage; and
      transferring the dirty data blocks to the secondary storage in the determined transfer order, wherein the secondary storage is a deduplication storage system.

14. The non-transitory computer-readable storage medium of claim 13, wherein a dirty data block is in proximity to the hot region of the primary storage based on at least one of:
   the dirty data block is physically close to a frequently accessed region of the primary storage;
   the dirty data block is physically close to another dirty data block;
   the dirty data block is physically close to a data block being written primary storage;
   the dirty data block is physically close to a region of the primary storage containing frequently updated metadata;
   the dirty data block is physically close to a region of the primary storage that frequently changes state, or
   the dirty data block is physical closeness to a number of dirty data blocks.

15. The non-transitory computer-readable storage medium of claim 13, wherein an access assessment of a dirty data block is determined based on readiness of a stable read resource for the dirty data block.

16. The non-transitory computer-readable storage medium of claim 13, wherein a dirty data block is given a higher priority based on at least one of:
   the dirty data block is physically close to a region of the primary storage containing frequently updated metadata; and
   contents of the dirty data block containing metadata about a file having one or more dirty data blocks.

17. The non-transitory computer-readable storage medium of claim 13, further comprising capturing a snapshot of the plurality of data blocks, wherein the snapshot represents a consistent state of the plurality of data blocks.

18. The non-transitory computer-readable storage medium of claim 13, further comprising:
   identifying the dirty data blocks by marking each data block in a transfer state if the data block is dirty and marking each data block in a normal state if the data block is not dirty, wherein only data blocks in the transfer state are transferred to the secondary storage; and
   marking the dirty data blocks in the normal state after the dirty data blocks have been transferred to the secondary storage.

19. A primary storage, comprising:
   a data protection logic configured to receive a request at the primary storage for a backup of a plurality of data blocks to a secondary storage, the plurality of data blocks comprising a plurality of dirty data blocks, wherein a dirty data block comprises a data block that has changed since a previous backup of the data block;
   backup the plurality of dirty data blocks to the secondary storage, wherein the backup comprises:
      a transfer order determinator configured to determine a transfer order of the dirty data blocks wherein a dirty data block is given a higher priority for transfer based on a proximity of the dirty data block to a hot region on the primary storage, and wherein the transfer order is different from a sequential logical order of the dirty data blocks provided by the primary storage; and
      the data protection logic further configured to transfer the dirty data blocks to the secondary storage in the determined transfer order, wherein the secondary storage is a deduplication storage system.

20. The primary storage of claim 19, wherein a dirty data block is in proximity to the hot region of the primary storage based on at least one of:
   the dirty data block is physically close to a frequently accessed region of the primary storage;
   the dirty data block is physically close to another dirty data block on the primary storage;
   the dirty data block is physically close to a data block being written to the primary storage;
   the dirty data block is physically close to a region of the primary storage that frequently changes state, or
   the dirty data block is physically close to a number of dirty data blocks on the primary storage.

21. The primary storage of claim 19, wherein an access assessment of a dirty data block is determined based on readiness of a stable read resource for the dirty data block.

22. The primary storage of claim 19, wherein a dirty data block is in proximity to the hot region of the primary storage based on at least one of:
   the dirty data block is physically close to a region of the primary storage containing frequently updated metadata;
   contents of the dirty data block containing metadata about a file having one or more dirty data blocks.

23. The primary storage of claim 19, wherein the data protection logic further configured to capture a snapshot of the plurality of data blocks, wherein the snapshot represents a consistent state of the plurality of data blocks.

24. The primary storage of claim 19, further comprising:
   a change tracker configured to identify the dirty data blocks by marking each data block in a transfer state if the data block is dirty and marking each data block in a normal state if the data block is not dirty, wherein only data blocks in the transfer state are transferred to the secondary storage; and
   mark the dirty data blocks in the normal state after the dirty data blocks have been transferred to the secondary storage.

* * * * *